US012420728B2

(12) United States Patent
Bennie et al.

(10) Patent No.: US 12,420,728 B2
(45) Date of Patent: Sep. 23, 2025

(54) VEHICLE HAVING PET DETECTION AND CONTROL

(71) Applicant: Ford Global Technologies, LLC, Dearborn, MI (US)

(72) Inventors: Brian Bennie, Sterling Heights, MI (US); Mahmoud Yousef Ghannam, Canton, MI (US); Clara Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 18/327,509

(22) Filed: Jun. 1, 2023

(65) Prior Publication Data
US 2024/0399986 A1  Dec. 5, 2024

(51) Int. Cl.
  *B60R 16/037*  (2006.01)
  *G06V 20/59*  (2022.01)

(52) U.S. Cl.
  CPC ............ *B60R 16/037* (2013.01); *G06V 20/59* (2022.01)

(58) Field of Classification Search
  CPC .............................. B60R 16/037; G06V 20/59
  See application file for complete search history.

(56) References Cited

U.S. PATENT DOCUMENTS

| 10,115,029 | B1 * | 10/2018 | Day | G06V 20/59 |
| 12,269,423 | B2 * | 4/2025 | Amadi | G06V 20/58 |
| 2009/0027188 | A1 * | 1/2009 | Saban | B60N 2/268 |
| | | | | 340/439 |
| 2017/0024618 | A1 * | 1/2017 | Morales Teraoka | B60W 30/09 |
| 2020/0130702 | A1 | 4/2020 | Ferreira et al. | |
| 2020/0298798 | A1 * | 9/2020 | Yamamoto | G08B 25/10 |
| 2022/0000071 | A1 * | 1/2022 | Matwiyoff | B25J 9/1697 |
| 2022/0048520 | A1 * | 2/2022 | Sato | B60H 1/00742 |
| 2022/0161761 | A1 * | 5/2022 | Moeller | H04L 9/0643 |
| 2022/0194228 | A1 | 6/2022 | Salter et al. | |
| 2022/0207278 | A1 * | 6/2022 | Nagata | H04N 5/77 |
| 2022/0234538 | A1 | 7/2022 | Buttolo et al. | |
| 2022/0355813 | A1 * | 11/2022 | Salter | G06V 10/945 |
| 2023/0398988 | A1 * | 12/2023 | Barrett | B60W 40/09 |
| 2025/0242658 | A1 * | 7/2025 | Rosenberg | G08B 21/22 |

FOREIGN PATENT DOCUMENTS

CN   115593189 A  *  1/2023

OTHER PUBLICATIONS

American Red Cross. "Pet Travel Safety". 2018. https://web.archive.org/web/20181109203832/https://www.redcross.org/get-help/how-to-prepare-for-emergencies/pet-travel-safety.html#expand (Year: 2018).*

* cited by examiner

*Primary Examiner* — Shardul D Patel
*Assistant Examiner* — Rose Ridder
(74) *Attorney, Agent, or Firm* — Frank Lollo; Price Heneveld LLP

(57) ABSTRACT

A vehicle is provided including a cabin interior, one or more sensors located on the vehicle and configured to capture images of the cabin interior and generate sensor outputs, one or more powered windows configured to be controlled between open and closed positions, and a controller processing the sensor outputs of the one or more sensors with one or more pet profiles to detect a pet in the cabin interior, the controller controlling the one or more powered windows based on the detected pet.

18 Claims, 6 Drawing Sheets

VEHICLE HAVING PET DETECTION AND CONTROL

FIELD OF THE DISCLOSURE

The present disclosure generally relates to a vehicle having pet recognition, and more particularly relates to a vehicle configured to sense the location and identity of a pet and control the vehicle environment.

BACKGROUND OF THE DISCLOSURE

Motor vehicles are commonly equipped with various sensors including imaging devices, such as cameras that may be located both on the exterior and the interior of the motor vehicle. The cameras generally can monitor the presence of users, such as occupants and pets both outside and inside the motor vehicle. Captured images can be processed to recognize pets onboard the motor vehicle. It may be desirable to provide for a detection system that detects and identifies a pet and provides control functions onboard the vehicle.

SUMMARY OF THE DISCLOSURE

According to a first aspect of the present disclosure, a vehicle including a cabin interior is provided. The cabin interior includes one or more sensors located on the vehicle and configured to capture images of the cabin interior and generate sensor outputs, one or more powered windows configured to be controlled between open and closed positions, and a controller processing the sensor outputs of the one or more sensors and one or more pet profiles to detect a pet in the cabin interior, the controller controlling the one or more powered windows based on the detected pet.

Embodiments of the first aspect of the present disclosure can include any one or a combination of the following features:
- one or more sensors comprise one or more imaging devices for capturing images;
- one or more imaging devices comprises at least one interior camera located in the vehicle;
- a controller determines size dimensions of the pet and controls the one or more powered windows based on the determined size dimensions;
- one or more imaging devices comprises one or more of LiDAR, radar, and infrared sensors;
- the one or more imaging devices further comprises at least one exterior camera for capturing images outside the vehicle;
- the controller further detects one or more objects including a passenger in the vehicle, and determines a recommended location of a pet based on a location of the passenger;
- the controller generates an output to incentivize the pet to move from one location in the vehicle to a new location within the vehicle;
- a treat dispenser disposed within the cabin interior, wherein the controller controls the treat dispenser to dispense one or more treats to incentivize the pet to move to the new location within the vehicle;
- an audio device to output sound to incentivize the pet to move to the new location;
- memory storing the one or more pet profiles; and
- one or more switch inputs, wherein the controller detects the pet proximate the one or more switch inputs and controls the one or more switch inputs.

According to a second aspect of the present disclosure, a vehicle including a cabin interior, and one or more sensors located on the vehicle and configured to capture images and generate sensor outputs, wherein the one or more sensors comprise one or more imaging devices for capturing the images in the cabin interior is provided. The vehicle also includes memory storing one or more pet profiles, one or more powered windows configured to be controlled between open and closed positions, and a controller processing the sensor outputs of the one or more sensors and the one or more pet profiles to detect a pet in the cabin interior, the controller controlling the one or more powered windows based on the detected pet.

Embodiments of the second aspect of the present disclosure can include any one or a combination of the following features:
- the controller determines size dimensions of the pet and controls the one or more powered windows based on the determined size dimensions;
- the one or more sensors further comprises one or more of LiDAR, radar, and infrared sensors;
- the controller further detects one or more objects including a passenger in the vehicle, and determines a recommended location of a pet based on a location of the passenger;
- the controller generates an output to incentivize the pet to move from one location in the vehicle to a new location within the vehicle;
- a treat dispenser disposed within the cabin interior, wherein the controller controls the treat dispenser to dispense one or more treats to incentivize a pet to move to the new location within the vehicle;
- an audio device to output sound to incentivize the pet to move to the new location; and
- one or more switch inputs, wherein the controller detects the pet proximate the one or more switch inputs and controls the one or more switch inputs.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
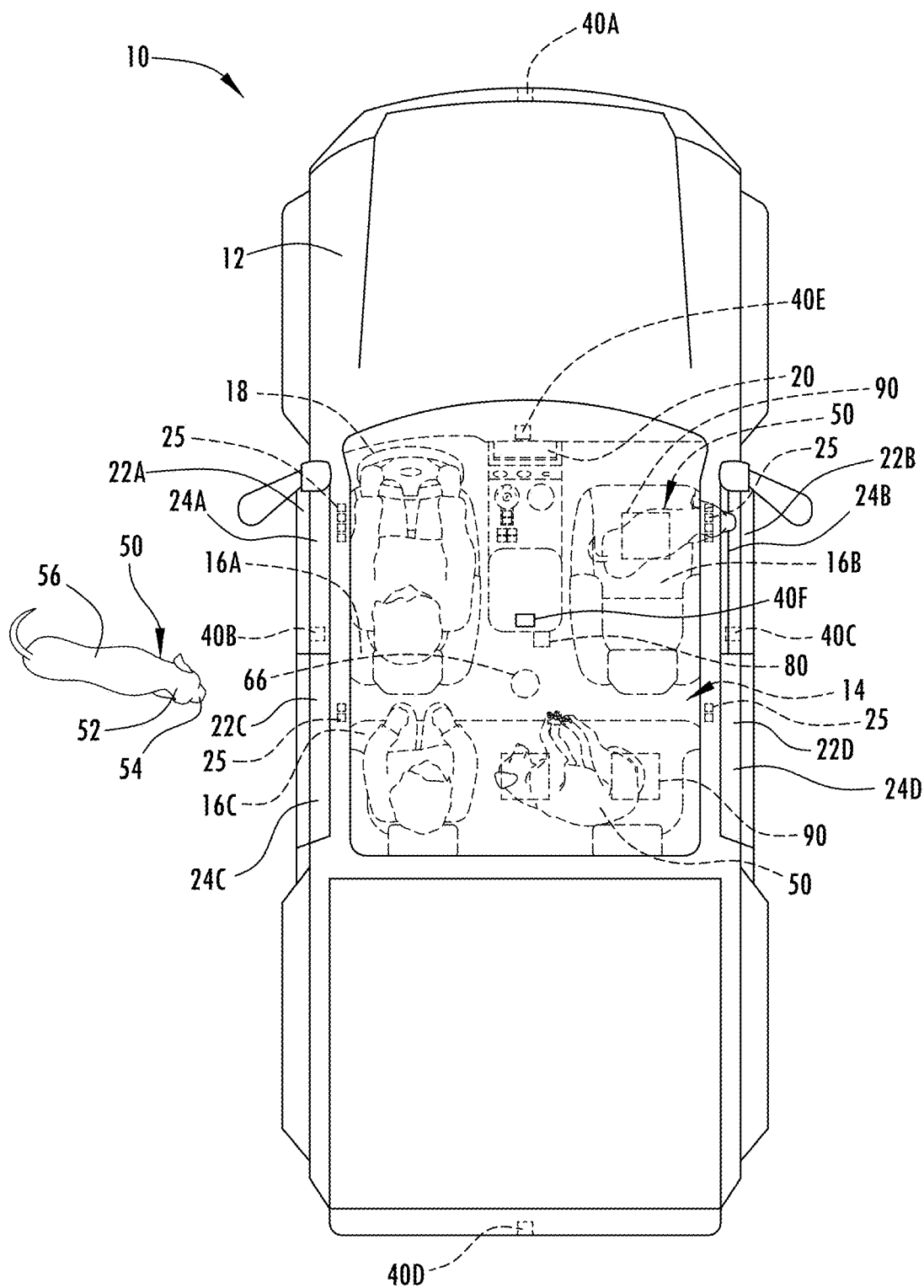
FIG. 1 is a schematic top view of a motor vehicle equipped with various sensors for detecting pets and vehicle controls.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower." "right," "left." "rear," "front." "vertical." "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having pet recognition and related vehicle controls. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated having a cabin interior 14 defined by a vehicle body 12 and configured with passenger seating for transporting users, such as one or more human passengers and pets in the cabin interior 14. The cabin interior 14 is generally defined by the vehicle body 12 and may include various features and components within the cabin interior 14. The cabin interior 14 may include an arrangement of passenger seats shown as a driver seat 16A, a front passenger seat 16B and a rear second row seat 16C supported on a floor. The driver seat 16A and passenger seat 16B are generally located in a front row of the cabin interior 14 and the rear seat 16C is shown located in a second or rear row of the cabin interior 14. It should be appreciated that the front seats 16A and 16B may include separate captains chairs or a bench seat. Similarly, the rear seat 16C may include a bench seat as shown or may include separate individualized captains' chairs, for example. The motor vehicle 10 may be equipped with a steering wheel 18 located in front of the driver seat 16A to enable the driver to steer the vehicle road wheels. Additionally, one or more human machine interfaces (HMI), such as a touchscreen display 20, audio speakers, microphone, etc. may be provided on the motor vehicle 10 to communicate with the driver and one or more passengers and pets in the motor vehicle 10.

The motor vehicle 10 is equipped with a plurality of access doors shown as doors 22A-22D. The doors 22A-22D may include manual or powered doors which may include an actuator such as a motor to actuate the doors between the open and closed positions to allow users, such as a driver, passengers and one or more pets to enter or exit the motor vehicle 10. The motor vehicle 10 has a plurality of side doors that includes a front driver side door 22A proximate to the driver seat 16A, a front passenger door 22B proximate to the front passenger seat 16B, a rear driver side door 22C proximate to one lateral end of rear seat 16C and a rear passenger side door 22D proximate to the opposite lateral end of rear seat 16C. Each of the doors 22A-22D includes a power actuated window, such as windows 24A-24D, respectively, which are typically located in the upper half of the door. Each of the power actuated windows 24A-24D may move between a lowered open window position and a raised fully closed position. The power actuated windows 24A-24D each are power actuated by an actuator such as electric motor that may be controlled in response to one or more window switches 25 shown located proximate to each of the doors 22A-22D. The window switches 25 may include toggle mechanical switches that allow the corresponding window to be actuated between the open and closed window positions or may include proximity sensor based switches, such as capacitive switches, for example. In addition, the power actuated windows 24A-24D may be controlled by a controller to accommodate a detected pet.

It should be appreciated that the motor vehicle 10 may include more than four side doors, or less than four side doors. The motor vehicle 10 may be a wheeled motor vehicle, such as a wheeled car, truck, SUV, van or bus, for example, having a cabin interior that may hold one or more pets. The motor vehicle 10 is equipped with image and signal processing and controls that advantageously assist with detection and identification of a pet in the cabin interior and operate to control one or more vehicle functions.

The motor vehicle 10 is equipped with a vehicle sensing system having plurality of sensors 40A-40F that are located on the motor vehicle 10 and configured on the vehicle 10 for sensing objects such as potential users, e.g., driver, passengers and pets. The sensors 40A-40F include exterior sensors 40A-40D and interior sensors 40E and 40F according to one embodiment. Each of the sensors 40A-40F includes one or more sensors and may include a plurality of sensors including an imaging sensor, e.g., a camera, an infrared (IR) sensor, a LiDAR sensor and a radar sensor, for example. The exterior sensors 40A-40D may detect users including potential passengers and pets expected to enter the motor vehicle 10 and located within a space generally surrounding the exterior of the motor vehicle 10. The interior sensors 40E and 40F may detect the presence of passengers and pets located within the cabin interior 14 of the vehicle 10. Each of the sensors 40A-40F may include an imaging sensor in the form of a camera that generates signals in the form of images showing the sensed objects captured within an imaging field of view. The plurality of sensors may include two exterior side sensors 40B and 40C, which are shown located on opposite lateral sides of the motor vehicle 10 shown near the roof and forward of the vertical body-mounted pillars and oriented to capture a field of view proximate to the side doors, an exterior front view camera sensor 40A shown in a front fascia of the vehicle 10, a rear exterior view sensor 40D shown in a rear fascia of the motor vehicle 10, a first rearward oriented interior camera 40E shown mounted near the dashboard, and a second rearward oriented interior camera sensor 40F shown mounted in the roof above a center console to capture images in the rearward portion of the cabin interior including objects located on or near the rear seat 16C. Each of the exterior sensors 40A-40D may acquire images of detection zones in the space around the perimeter of the motor vehicle 10 including capturing door detection regions covering the entrance for the side doors. The interior sensors 40E and 40F may acquire images and other sensed signals in the interior cabin 14 of the vehicle 10. The acquired images and other sensed signals may be processed by a controller using video processing to identify objects, such as one or more persons and pets as potential users and the position of the people and pets relative to the vehicle 10 and the side doors and windows and seats within the cabin interior 14.

The sensors 40A-40F may include an imaging camera for generating captured images that may be processed using image recognition. In addition, the sensors 40A-40F may include time-of-flight (TOF) sensors such as radar sensors for sensing objects by transmitting radio waves and processing the reflections from one or more objects to determine distance to the objects and location of the objects. The sensors 40A-40F may further include LiDAR which may generate a light signal and process light detection such as light reflection from one or more objects to determine distance and location of the objects. It should be appreciated that other sensors may be included such as ultrasonic sensors. The radar and ultrasonic sensors may be used to detect the location, size and relative distance of objects outside the motor vehicle 10 and within the motor vehicle 10. For example, sensor outputs may be processed to detect and identify a particular pet and the size of the pet and relative features of the pet, according to one example. It should be appreciated that other sensors such as IR sensors may be employed on the motor vehicle 10 to sense objects, such as potential users, including pets, relative to the motor vehicle 10 and inside the motor vehicle 10, including objects proximate to the doors, switches, seats and to identify each object and the distance and location of the object relative to the motor vehicle 10 both inside the motor vehicle 10 and outside the vehicle 10 for use in assisting with the controllable features of the motor vehicle 10 including controlling the power actuated windows, for example.

The motor vehicle 10 is shown having an animal 50, such as a dog, for example, shown located laying down on the rear seat 16C within the cabin interior 14 of the vehicle 10. Another pet 50 is shown located outside of the motor vehicle 10 and in close proximate to the exterior of the motor vehicle 10. Each of the pets 50 may include a dog, cat or other animal that may be transported within the motor vehicle 10. The pet 50 shown located on the exterior of the motor vehicle 10 may approach the vehicle 10 to gain access for entry into the cabin interior 14 of the motor vehicle 10. In doing so, the exterior sensors 40A-40D each including an imaging sensor in the form of a camera and other sensors may capture images and other sensed signals to detect and identify one or more sensed pets 50. The captured images and other sensed signals may be processed by a processor and a controller to detect the presence of a pet and to determine the identity of the pet, and features of the pet including size, shape and color of the body 56, the head 52 and the face 54, including the nose, mouth, ears and eyes, and the size, shape and color of other features, such as the height and width of such body features and color patterns.

The interior sensors 40E and 40F may detect the presence and identity and certain physical features of a pet located within the cabin interior 14 of the motor vehicle 10. This may include detecting the pet located on the vehicle floor, on a cargo area, on a seat or anywhere within the cabin interior 14. The sensor outputs including the images captured may be processed by a processor associated with the controller to detect the presence and location of a pet and to determine which identified pet and the size features of the pet including the size of the body, the head and the face. In addition, the sensor outputs may be further processed to determine a state of the pet, such as whether the pet is comfortably laying down or standing up or is experiencing excessive temperature or sunlight or other stressful situations. The controller may determine whether or not to actuate a window to move the window to an open position and by how much distance to determine and/or to adjust the temperature of the cabin interior 14 in the motor vehicle 10. The controller may activate an actuator to open and close one or more windows and adjust temperature depending on the placement of the pet in the cabin interior 14 and the needs of the pet as described herein such as whether the pet need fresh air or an increased or decreased temperature.

To detect and identify a pet 50, the captured images and other sensors outputs may be processed by the processor associated with the controller as described herein. Each of the pets 50 has a distinct body shape with distinct body characteristics that may be identified by processing the images and other sensor outputs. Each pet 50 shown has a head 52 with a face 54 and a body 56. Each of the head 52, the face 54, and the body 56 of each pet 50 may vary from one pet to another pet. The processor associated with the controller may look at facial images of the pet 50 to identify features of the head 52 and face 54 to try to identify the unique pet 50 from a stored set of features of known pets. In addition, the processor associated with the controller may process images and sensor outputs of the body parts of the pet 50 to determine a size of the pet 50 including the size of the head 52 which may be used in determining an opening size of a window.

Figure 2:
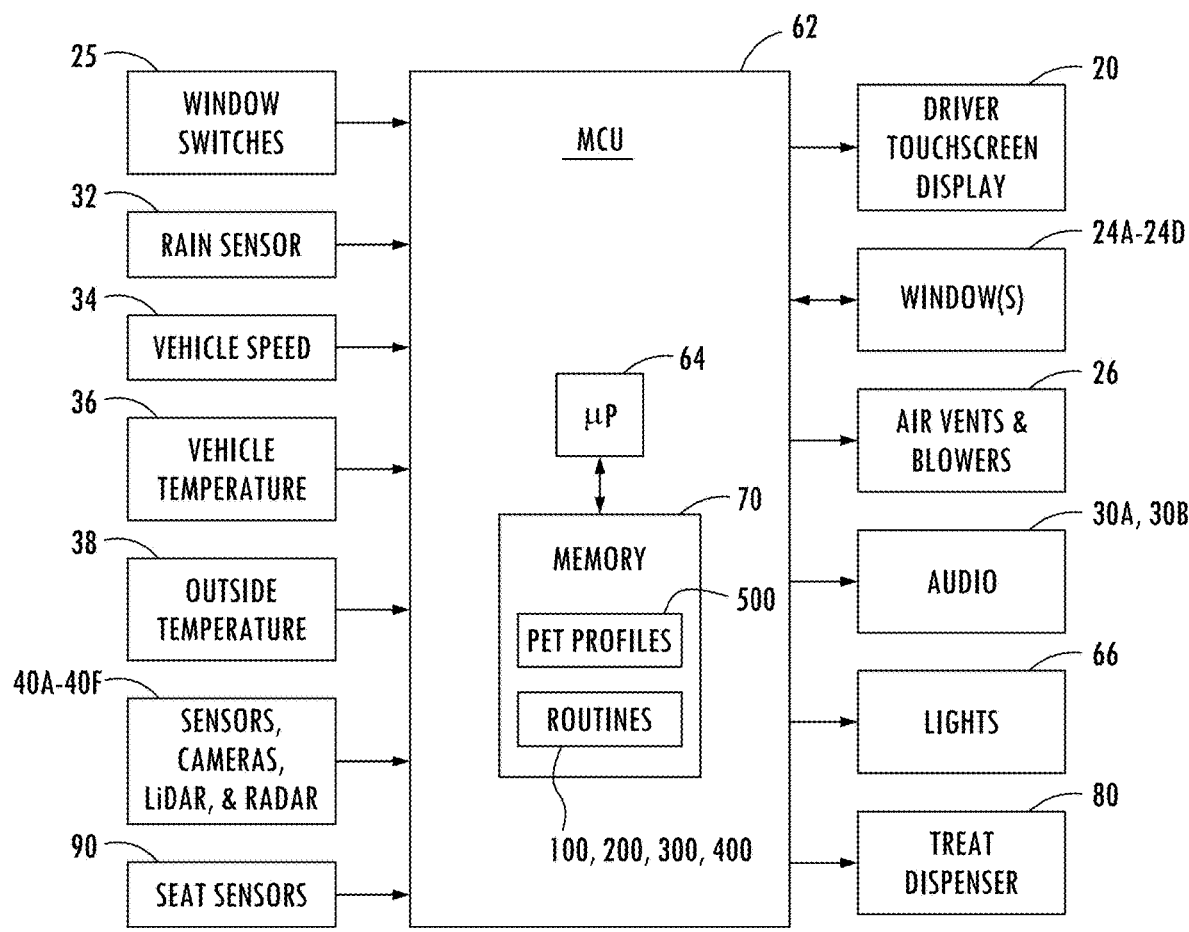
FIG. 2 is a block diagram illustrating a controller configured to process sensor outputs and identify characteristics of a pet and perform control functions.

Referring to FIG. 2, the motor vehicle 10 is shown having a vehicle controller 62 that is configured to detect a pet either outside or inside the motor vehicle 10 and control one or more vehicle features. The vehicle controller 62 may include associated control circuitry, such as a microprocessor 64 and memory 70. It should be appreciated that the vehicle controller 62 may be comprised of analog and/or digital control circuitry. Stored in memory 70 are one or more routines including routines 100, 200, 300 and 400, for example, which may be executed by the microprocessor 64. In addition, various stored pet recognition profiles 500 may be stored in memory 70 and processed by the microprocessor 64. The stored pet recognition profiles 500 may include stored features or parameters including facial characteristics, body characteristics, bone structure characteristics, and pose characteristics of known pets that have been entered into the database and stored in memory 70 for use to determine identification of a pet detected in the motor vehicle 10. The various characteristics may include size, shape and color of one or more features of the pet. The stored pet recognition profiles 500 may include parameters that are recorded during a training process or learned with machine learning or artificial intelligence, for example.

The controller 62 is shown receiving inputs from each of the sensors 40A-40F. In addition, the controller 62 receives inputs from a rain sensor 32, a vehicle speed sensor 34, a vehicle interior temperature sensor 36, a vehicle outside temperature sensor 38 and seat sensors 90. The controller 62 may process the images and other sensor outputs captured by the sensors 40A-40F as well as sensors 32, 34, 36 and 38 pursuant to routines 100, 200, 300 and 400 and may generate control signals to control any of a number of devices or features on the vehicle. The control of devices or features on the vehicle may include controlling movement of the windows 24A-24D between open and closed positions, controlling air vents and blowers 26, controlling outputs on the display 20, controlling outputs on audio devices 30A and 30B, controlling lights 66, and controlling a treat dispenser 80, for example. The treat dispenser 80 may include a controlled actuator that automatically dispenses food, treat or scent for the pet which may be used to entice the pet to move to a new location in the vehicle. In addition, the controller 62 may communicate with the touchscreen display 20 to receive HMI inputs and to display information to the driver and passengers in the motor vehicle 10.

Figure 3:
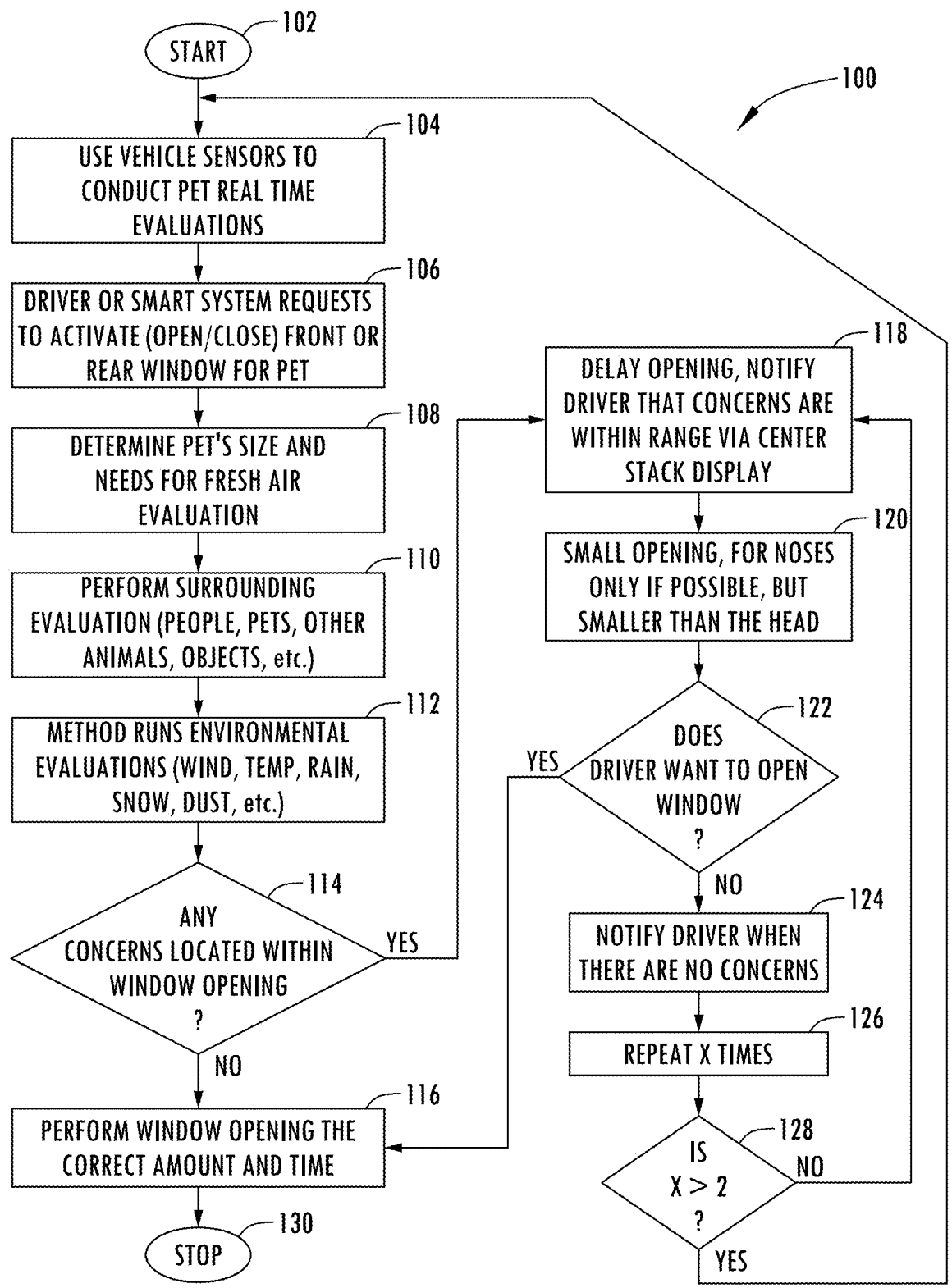
FIG. 3 is a flow diagram illustrating a routine for sensing a pet in the motor vehicle and controlling actuation of the vehicle windows.

Referring to FIG. 3, a routine 100 is illustrated for detecting and identifying a pet onboard the motor vehicle and controlling one or more devices or features related to the vehicle 10. Routine 100 begins at step 102 and proceeds to step 104 to use the various vehicle sensors to conduct real-time evaluations to capture one or more pets onboard the vehicle. This may include utilizing one or more imaging sensors in addition to radar, LiDAR, IR and other sensing devices. Next, at step 106, routine 100 receives a request from a driver or smart control system onboard the vehicle to activate an actuator such as to open or close one or more of the front or rear windows to accommodate a given pet. Proceeding to step 108, routine 100 will determine the size of the pet and pet features and the needs of the pet such as the need for fresh air by performing an evaluation. The size of the pet may be determined from the sensor outputs including the video images. The needs of the pet may be based on a history or other factors including interior temperature, sunlight and other environmental conditions. Routine 100 then proceeds to step 110 to perform a surrounding evaluation to identify objects, such as people, pets and other objects. This may include identifying a person or pet proximate to the exterior surface of the vehicle which could potentially interface with a pet within the vehicle. Routine 100 then proceeds to step 112 to run environmental evaluations to detect environmental conditions, such as wind, exterior temperature, rain, snow, dust and other environmental factors on the exterior of the vehicle.

Routine 100 then proceeds to decision step 114 to determine if there are any concerns located within a window opening. Concerns may include objects that may get lodged within the window or objects that may be reachable by a pet extending through the window. If there are no concerns located within the window opening, routine 100 proceeds to step 116 to perform the requested window opening by the correct amount e.g., distance, and time before stopping at step 130.

If there are any concerns located within a window opening, routine 100 proceeds to step 118 to delay the window opening and notify the driver of the motor vehicle that one or more concerns are within range via the center stack display, for example. Next, at step 120, routine 100 determines whether to provide a small window opening, for the nose of the pet only, if possible, but smaller than the size of the head of the pet. Next, at decision step 122, routine 100 determines if the driver wants to open the window and, if so, performs the window opening by the correct amount and time at step 116, before stopping at step 130. If the driver does not want to open the window at decision step 122, routine 100 proceeds to step 124 to notify the driver there are no concerns, and to repeat X times at step 126 until X is greater than 2 as determined at decision step 128 when routine 100 returns to the beginning. Thus, after being notified more than twice, routine 100 returns to the beginning.

Figure 4:
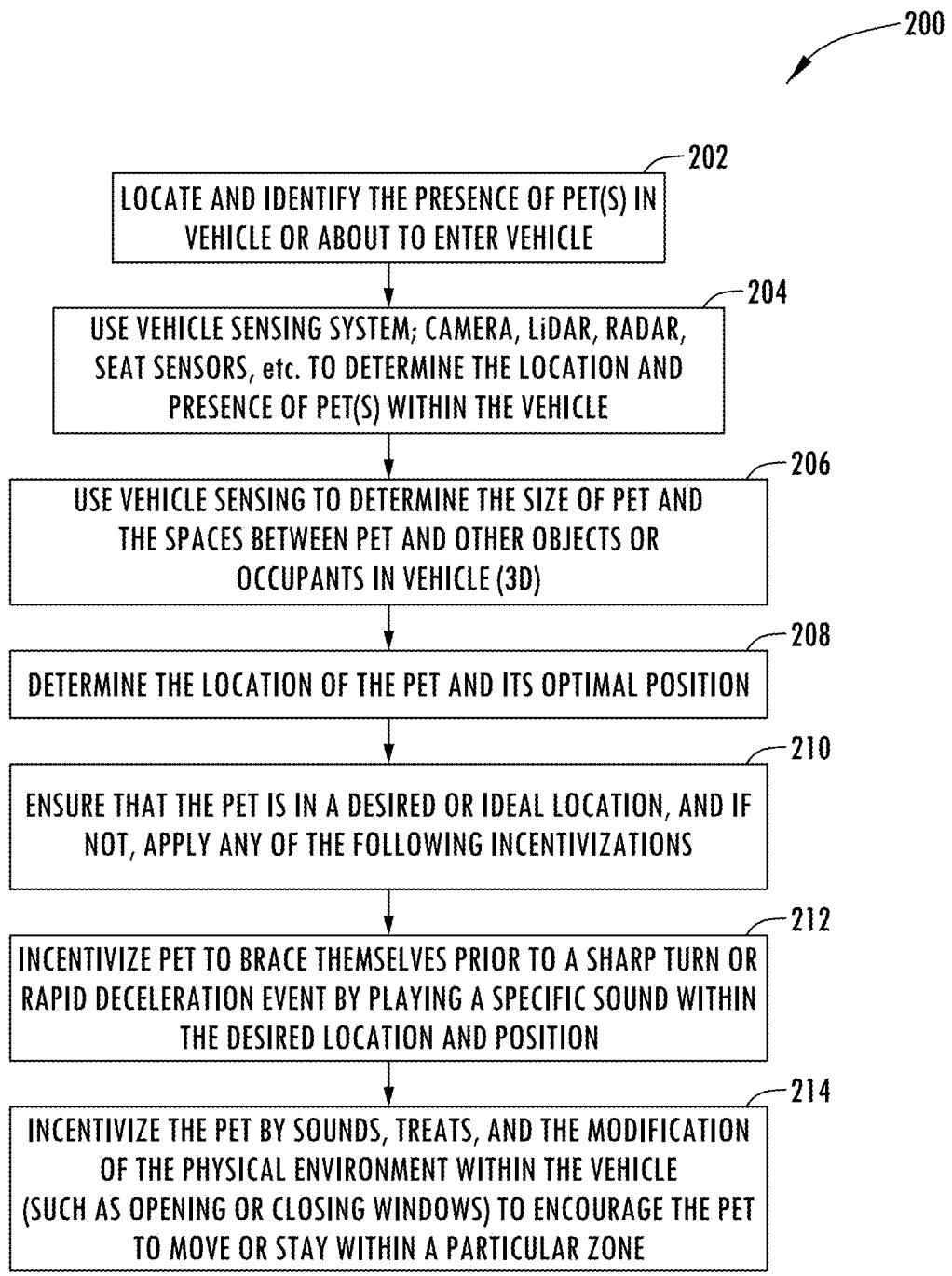
FIG. 4 is a flow diagram illustrating a routine for identifying a pet in a vehicle and providing incentivized control outputs for the pet.

Referring to FIG. 4, routine 200 is illustrated beginning at step 202 where routine 200 locates and identifies the presence of one or more pets in the vehicle or pets that are about to enter the vehicle. Next, at step 204, routine 200 uses a vehicle sensing system including the cameras, LiDAR, radar, seat sensors, etc. to determine the location and presence of pets within the vehicle. Next, at step 206, routine 200 uses the vehicle sensing to determine the size of a detected pet and the space between the pet and other objects or occupants in the motor vehicle. Routine 200 then determines the location of the pet in its optimal position within the motor vehicle at step 208. Next, at step 210, routine 200 ensures that the pet is in a desired or ideal location and, if not, applies any of the following incentivizations. At step 212, routine 200 incentivizes the pet to brace themselves prior to a sharp turn or a rapid deceleration event by playing a specific audio sound on an audio device within the desired location and position. In step 214, routine 200 will incentivize the pet with sounds, treats and the modification of the physical environment within the vehicle, such as opening and closing windows to encourage the pet to move or stay within a particular zone within the vehicle.

Figure 5:
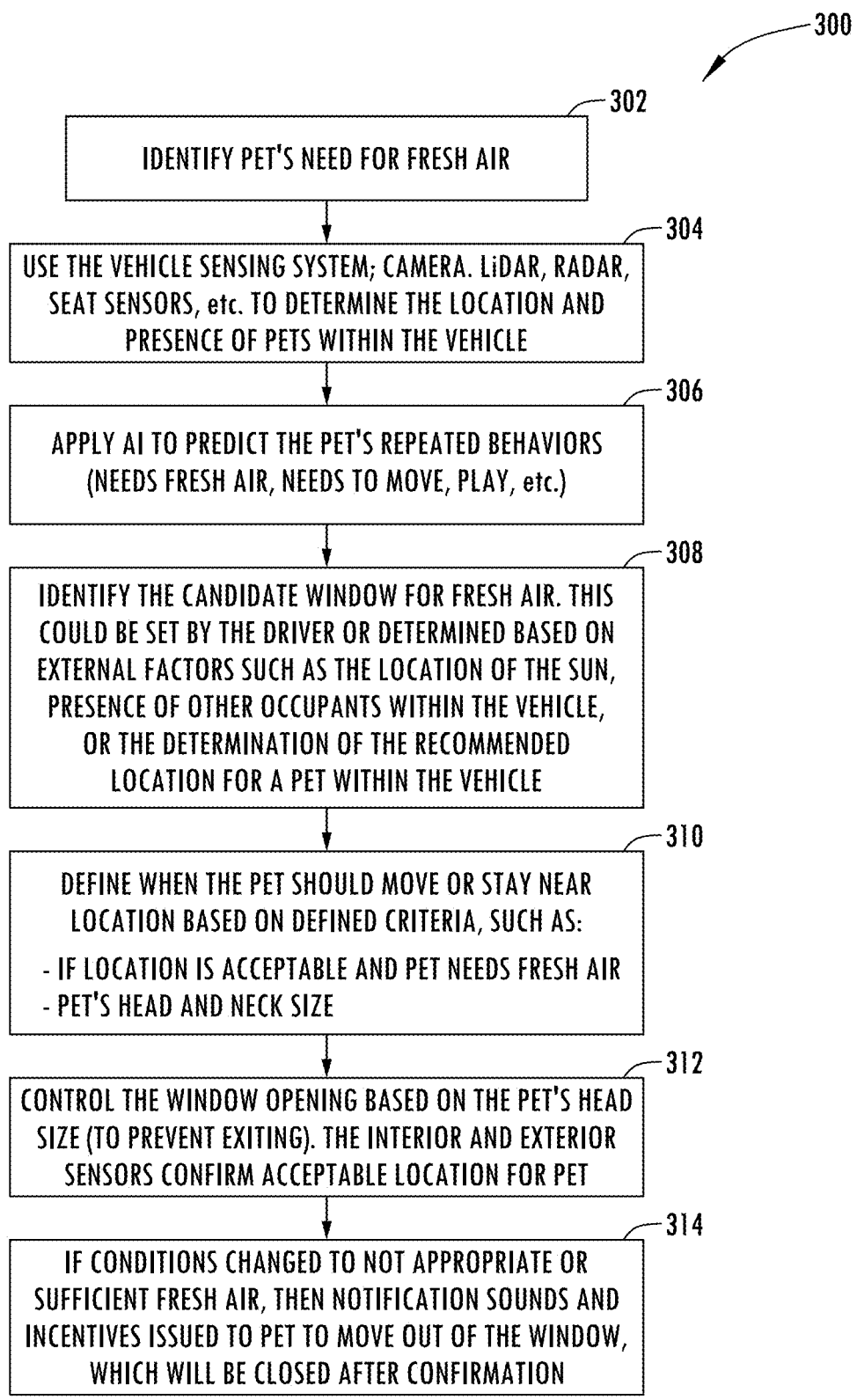
FIG. 5 is a flow diagram illustrating a routine for identifying needs of a pet and controlling location of the pet and various features of the motor vehicle.

Referring to FIG. 5, routine 300 is illustrated beginning at step 302 in which the pet's needs for fresh air are identified. This may be based on environmental conditions, such as temperature, humidity, and known characteristics of the identified pet. Routine 300 then proceeds to step 304 to use the vehicle sensing system, including the camera, LiDAR, radar, seat sensors, etc. to determine the location and presence of one or more pets within the vehicle. Next, at step 306, routine 300 will apply artificial intelligence (AI) to predict the pet's repeated behavior, such as needs for fresh air, need to move, need to play, etc. It should be appreciated that known characteristics may be stored in memory or may further be learned by applying the one or more machine learning or AI tools. Routine 300 then proceeds to step 308 to identify the candidate window for fresh air. This could be set by the driver or based on external factors, such as location of the sun, presence of other occupants within the vehicle, or the determination of the recommended location for a pet within the vehicle. Routine 300 then proceeds to step 310 to define when the pet should move or stay near in location based on defined criteria, such as if it is acceptable for the pet and the pet needs fresh air and the size of the pet's head and neck size. Routine 300 then proceeds to step 312 to control the window opening based on the pet's head size to prevent the pet from exiting through the window. The interior and exterior sensors may confirm the acceptable recommended position of the pet. Finally, at step 314, routine 300 will return if conditions change to inappropriate or sufficient fresh air, then notification sounds and incentives are issued to the pet to move out of the window, which may be closed after confirmation.

Figure 6:
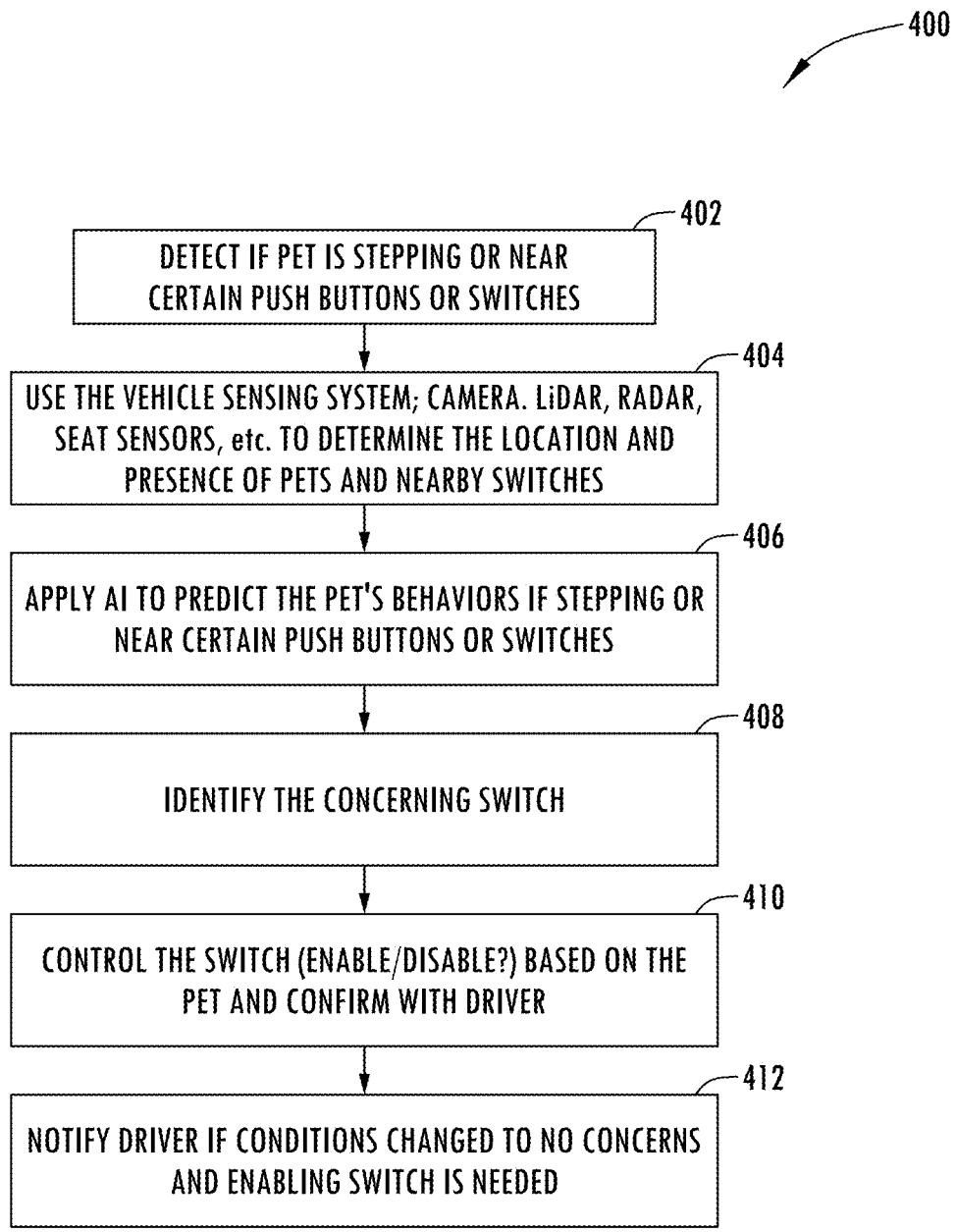
FIG. 6 is a flow diagram illustrating a routine for detecting location of a pet and controlling one or more switches on the motor vehicle.

Routine 400 is illustrated in FIG. 6 at step 402 which detects if the pet is stepping upon or near certain pushbuttons or switches within the vehicle cabin. At step 404, routine 400 will use the vehicle sensing system including the camera, LiDAR, radar, seat sensors, etc. to determine the location and presence of pets and nearby switches within the cabin interior. At step 406, routine 400 will apply machine learning or AI to predict the pet's behaviors as to whether the pet is stepping on or near certain pushbuttons or other switches within the cabin interior. Routine 400 will then identify any concerning switch or switches at step 408. Next, at step 410, routine 400 will control the relevant switches such as enabling or disabling the switches based on interference by the pet and will confirm the control of the switches with the driver. One or more switches may be disabled or controlled to provide reduced or alternate functionality when a pet is determined to be interfering with the switch. At step 412, routine 400 will notify the driver if conditions have changed to no concern and will reenable the switches as needed. As a result, pet interference with one or more switches may be detected and the switches may be disabled or otherwise limited in ability to prevent inadvertent actuation of the switches and control features related thereto.

Accordingly, the motor vehicle advantageously provides for a plurality of sensors located onboard the vehicle and configured to capture images in order to identify one or more pets and to control vehicle features including one or more powered windows between opened and closed positions. The controller may advantageously process the various sensor outputs of one or more sensors and detect the pet in the vehicle and control the one or more powered windows based on the detected pet and may further control user input switches which may potentially be interfered with by the pet.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:
a cabin interior;
one or more sensors located on the vehicle and configured to capture images of the cabin interior and generate sensor outputs;
one or more powered windows configured to be controlled between open and closed positions; and
a controller processing the sensor outputs of the one or more sensors and one or more pet profiles and detecting a pet in the cabin interior and a size of the pet based on the sensor outputs and the one or more pet profiles, the controller further determining a location of the pet in the cabin interior and controlling the one or more powered windows to control a window opening size based on the size of the pet and the determined location of the pet.

2. The vehicle of claim 1, wherein the one or more sensors comprise one or more imaging devices for capturing the images.

3. The vehicle of claim 2, wherein the one or more imaging devices comprises at least one interior camera located in the vehicle.

4. The vehicle of claim 3, wherein the controller determines size dimensions of the pet and controls the one or more powered windows based on the determined size dimensions.

5. The vehicle of claim 4, wherein the one or more imaging devices comprises one or more of LiDAR, radar, and infrared sensors.

6. The vehicle of claim 5, wherein the one or more imaging devices further comprises at least one exterior camera for capturing exterior images outside the vehicle.

7. The vehicle of claim 1, wherein the controller further detects one or more objects including a passenger in the vehicle, and determines a recommended location of the pet based on a location of the passenger.

8. The vehicle of claim 1, wherein the controller detects a vehicle turn or deceleration event and generates a control output to incentivize the pet to move from one location in the vehicle to a new location within the vehicle when the vehicle turn or deceleration event is detected.

9. The vehicle of claim 8 further comprising an audio device to output sound to incentivize the pet to move to the new location.

10. The vehicle of claim 1, further comprising memory storing the one or more pet profiles.

11. The vehicle of claim 1 further comprising one or more switch inputs, wherein the controller detects the pet proximate to the one or more switch inputs and controls the one or more switch inputs.

12. A vehicle comprising:

a cabin interior;

one or more sensors located on the vehicle and configured to capture images and generate sensor outputs, wherein the one or more sensors comprise one or more imaging devices for capturing the images in the cabin interior;

memory storing one or more pet profiles;

one or more powered windows configured to be controlled between open and closed positions; and a controller processing the sensor outputs of the one or more sensors and the one or more pet profiles and detecting a pet in the cabin interior and a size of the pet based on the sensor outputs and the one or more pet profiles, the controller further determining a location of the pet in the cabin interior and controlling the one or more powered windows to control a window opening size based on the size of the pet and the determined location of the pet.

13. The vehicle of claim 12, wherein the controller determines size dimensions of the pet and controls the one or more powered windows based on the determined size dimensions.

14. The vehicle of claim 13, wherein the one or more sensors further comprises one or more of LiDAR, radar, and infrared sensors.

15. The vehicle of claim 12, wherein the controller further detects one or more objects including a passenger in the vehicle, and determines a recommended location of the pet based on a location of the passenger.

16. The vehicle of claim 12, wherein the controller detects a vehicle turn or deceleration event and generates a control output to incentivize the pet to move from one location in the vehicle to a new location within the vehicle when the vehicle turn or deceleration event is detected.

17. The vehicle of claim 16 further comprising a treat dispenser disposed within the cabin interior, wherein the controller controls the treat dispenser to dispense one or more treats to incentivize the pet to move to the new location within the vehicle.

18. The vehicle of claim 16 further comprising an audio device to output sound to incentivize the pet to move to the new location.

* * * * *